(12) United States Patent
Weisbrod

(10) Patent No.: US 7,336,216 B2
(45) Date of Patent: Feb. 26, 2008

(54) PARACHUTED RADAR DECOY

(75) Inventor: Gil Weisbrod, Haifa (IL)

(73) Assignee: Rafael Armament Development Authority Ltd., Haifa (IL)

( * ) Notice: Subject to any disclaimer, the term of this patent is extended or adjusted under 35 U.S.C. 154(b) by 0 days.

(21) Appl. No.: 11/406,446

(22) Filed: Apr. 18, 2006

(65) Prior Publication Data

US 2007/0046524 A1  Mar. 1, 2007

Related U.S. Application Data

(63) Continuation of application No. PCT/IL2004/000913, filed on Oct. 4, 2004.

(30) Foreign Application Priority Data

Oct. 19, 2003  (IL) .................................. 158468

(51) Int. Cl.
*H01Q 15/00* (2006.01)
*H04K 3/00* (2006.01)
*G01S 13/00* (2006.01)

(52) U.S. Cl. .................... 342/9; 342/5; 342/7; 342/13; 342/14

(58) Field of Classification Search ............... 342/1–20
See application file for complete search history.

(56) References Cited

U.S. PATENT DOCUMENTS

| | | | | |
|---|---|---|---|---|
| 2,450,417 | A | * | 10/1948 | Bossi .............................. 342/8 |
| 2,546,078 | A | | 3/1951 | Rogallo et al. |
| 2,576,255 | A | | 11/1951 | Hudspeth et al. |
| 3,104,612 | A | * | 9/1963 | Knacke et al. ................ 342/10 |
| 3,296,617 | A | | 1/1967 | Rogallo |
| 4,695,841 | A | | 9/1987 | Billard |
| 4,709,235 | A | | 11/1987 | Graham, Jr. et al. |
| 5,530,445 | A | | 6/1996 | Veazey |
| 5,736,954 | A | | 4/1998 | Veazey |
| 5,940,023 | A | | 8/1999 | Hintzke et al. |
| 6,791,486 | B2 | * | 9/2004 | Mourry et al. ................. 342/7 |

* cited by examiner

Primary Examiner—Bernarr E. Gregory
(74) Attorney, Agent, or Firm—Frishauf, Holtz, Goodman & Chick, P.C.

(57) ABSTRACT

A radar decoy having radar reflectors disposed in the interior of the inflated canopy of a descending parachute as a first set of four corner reflectors, and a second set of corner reflectors disposed on the exterior of the canopy integral with the first set of corner reflectors, to form an octahedron of eight corner reflectors. The radar decoy is pliable and folded with the parachute for stowage in the interior of a canister. When loaded on a vehicle flying in a trajectory, the canister may open at a point P on the trajectory, to release the parachute, and thereby deploy the radar decoy to become operative.

33 Claims, 4 Drawing Sheets

PARACHUTED RADAR DECOY

CROSS REFERENCE TO RELATED APPLICATION

This application is a continuation of PCT/IL2004/000913 filed 4 Oct. 2004.

FIELD OF THE INVENTION

The present invention relates to passive radar decoys and in particular, to corner reflectors descending by parachute and configured to fake large targets

BACKGROUND OF THE INVENTION

U.S. Pat. No. 5,530,445 to Veazey divulges "Distress signal kits comprise a parafoil for carrying aloft various emergency or distress signals particularly radar reflective materials, . . . ". However, there is no indication of an implementation for conventional parachutes. Further, U.S. Pat. No. 5,940,023 to Hintzke et al., discloses a "Parachute apparatus having enhanced radar reflective characteristics", where " . . . a radar reflective member 26 is preferably positioned attached to the suspension members 16." The invention of Hintzke et al. permits to implement a radar reflector of a size limited by the space between the suspension members 16, and therefore, of restricted radar cross-section (RCS). Such a small radar reflector is not able to fake a large target.

It would thus be advantageous to provide a parachuted radar reflector taking advantage of the space available in the interior of the canopy of a parachute without impairing aerodynamic properties, to implement a radar decoy simulating large targets.

As a solution, advantage is taken of the space available in the interior of the canopy and of the space adjacent the air-inlet opening of the parachute, providing for a large size decoy simulating a large target.

The term decoy is used below to indicate a decoy simulating a large target by providing a large radar cross-section.

OBJECTS AND SUMMARY OF THE INVENTION

It is an object of the present invention to provide a parachuted radar decoy and a method for operating a radar decoy faking a large target when descending on a parachute, by taking advantage of the space available in the interior of the canopy of the parachute to fake large size targets. There are disclosed a radar decoy (1) providing a large radar cross-section, or radar decoy (1), and a method with a radar decoy (1), functioning with a descending parachute (5) having an inflated canopy (7) for retarding descent, the canopy having an interior, an exterior, an apex (19), and a bottom opening (15) with a diameter (21), and a periphery (23), to which a first upper end (25) of a plurality of suspension lines (9) is fixedly connected in spaced apart distribution to retain a hanging load (11), which is fixedly connected to a second lower end (27) of the plurality of suspension lines, characterized by:

a radar reflector (3) having an interior portion disposed in the interior of the canopy intermediate the apex and the bottom opening, and a plurality of reflective panels forming the radar reflector, each reflective panel being coupled to the periphery, and at least two reflective panels being coupled the apex.

The radar decoy may have at least four trihedral corner reflectors (101) disposed in the interior of the canopy and forming the interior portion, which are configured as three mutually orthogonal reflective panels (103, 117, 125) coupled to the periphery, and have two reflective triangular panels (103, 117) being also coupled to the apex.

Furthermore, the two reflective triangular panels (103, 117) disposed in the interior of the canopy extend to conform to and to be coupled to the interior of the canopy, intermediate the apex and the bottom opening, whereby a first and a second substantially semi-circular panel (203, 207) provide a radar reflector with an enhanced radar cross-section. Moreover, the radar reflector has an exterior portion (303, 305) disposed on the exterior of and below the canopy adjacent the bottom opening, and a plurality of reflective panels (303, 305, 125), each panel having a surface and forming the exterior portion being coupled to the periphery, and two panels being coupled to a central line extending from the apex top to the load.

The radar decoy may have an exterior portion (303, 305) that is configured to form four trihedral corner reflectors (301), and the exterior portion is preferably integral with the interior portion. When integrated, the interior portion and the exterior portion of the radar reflector are configured to form eight trihedral corner reflectors.

In addition, the two reflective triangular panels (103, 117) of the interior portion extend to conform to and to be coupled to the interior of the canopy, intermediate the apex and the bottom opening, whereby a first and a second substantially semi-circular panel (203, 207) provide a radar reflector with an enhanced radar cross-section.

The load attached to the parachute of the radar decoy is functionally operative as a decoy if desired, and is either one of both operative in association with the radar decoy and independent therefrom.

The radar decoy features a canopy that is hemispherical and has a canopy height (43) equal to substantially half the diameter (21) of the bottom opening (15), and a central line (29), which is coupled from the apex (19) to the load (11). The interior portion has three mutually orthogonal reflective panels (103, 117, 125), each panel having a surface and forming four trihedral radar corner reflectors. In more details, there is a first panel (103) of isosceles triangular shape having a first panel base side (107) spanning the inlet opening (15) and having a height equal in length to the canopy height, with a first panel top corner (111) opposite the first panel base side, and two opposite first panel base corners (113, 115) adjacent the first panel base side, the first panel top corner and the two first panel base corners being fixedly coupled to, respectively, the apex and to two diametrically opposite points disposed on the periphery (23). There is also a second panel (117), orthogonally intersecting and identical in shape and surface to the first panel, having a second panel base side 118, which is fixedly coupled by a second panel top corner (119) to the apex, and by each one of two second panel base corners (121) to the periphery. Finally, a third panel (125) of square surface is orthogonally disposed adjacent the first and the second panel base side of respectively, the first and of the second panel, to form four trihedral corner reflectors, with each one corner of the square surface being fixedly coupled to the periphery at the first and at the second panel base corners, whereby the central line is collinear with an intersection axis common to both the first and the second panel.

Preferably, the radar decoy may have an exterior portion with three mutually orthogonal panels, each panel having a surface forming four trihedral radar corner reflectors. There is thus a fourth panel, or first lower triangular panel surface (303), of shape and surface equal to the first panel (103), extending away therefrom in mirroring symmetry about the first panel base side (107), with two first lower base corners each adjacent the first panel base corners (113, 115), and in opposite to the first panel top corner (111), a first panel lower corner (309) fixedly coupled to a lower point (311) on the central line (29), at a distance from the apex (19) equal to twice the canopy height (43). In addition, a fifth panel, or second lower triangular panel surface (305), orthogonal to the fourth panel and identical thereto in shape and in surface, has two second panel lower base corners adjacent the second panel base corners (121, 123), and has a second panel lower corner (315) which is fixedly coupled to the lower point (311), whereby the third panel (125) is common to the first, the second, the fourth and the fifth panel to form eight trihedral radar corner reflectors, providing an interior portion and an exterior portion operative as an omnidirectional isometric octahedral radar reflector decoy.

The surface of each one of the first and the second reflective triangular panels (103, 117) is preferably extended to conform to and to be coupled to the interior of the canopy, intermediate the apex and the bottom opening, whereby a first and a second semi-circular panel (203, 207) provide a radar reflector of enhanced radar cross-section. As a further improvement, a cluster of radar decoys is formed by attaching together a plurality of parachutes having radar reflectors, the parachutes being coupled together at the second lower end (27) of the suspension lines, whereby an enlarged radar cross-section is achieved by the cluster of parachutes.

In practice, the radar decoy has reflective panels made from pliable, lightweight and thin radar reflective material foldable for containment in a small dimension canister and operable for stowage and ejection from an airborne vehicle (V), whereby the radar decoy becomes operative after ejection from the airborne vehicle and deployment of the parachute. It is noted that if desired, the airborne vehicle is an unmanned airborne vehicle that is propelled by a rocket motor or launched by a piece of artillery.

BRIEF DESCRIPTION OF THE DRAWINGS

In order to understand the invention and to see how it may be carried out in practice, a preferred embodiment will now be described, by way of non-limiting example only, with reference to the accompanying drawings, in which.

DETAILED DESCRIPTION OF PREFERRED EMBODIMENTS

The invention will now be described by way of example only. It is understood, that that the exemplary embodiments mentioned herein are provided only for the sake of clear explanation, and are not intended to show the complete scope of the invention, which should be interpreted in the light of the appended claims.

Figure 1:
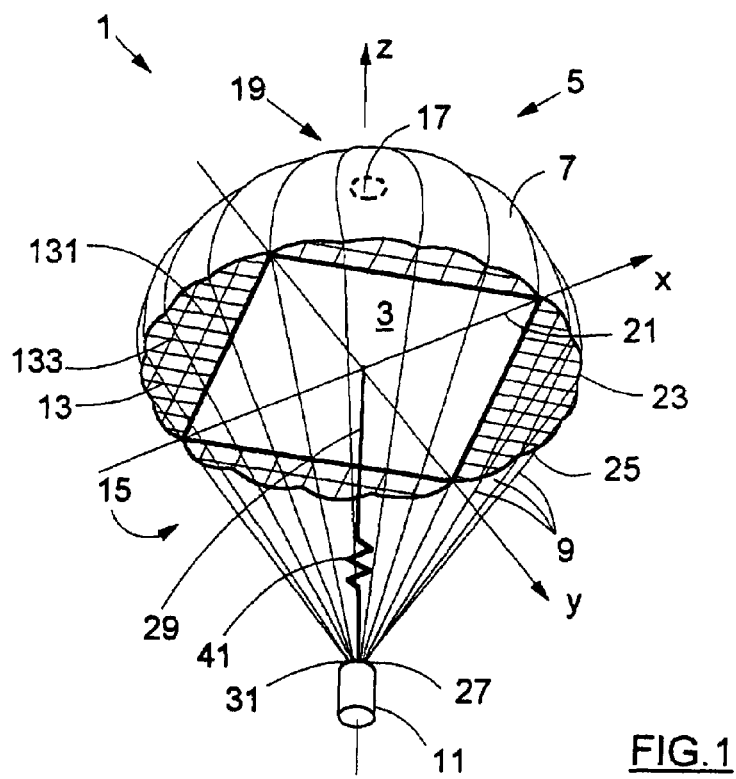
FIG. 1 illustrates a radar decoy.

FIG. 1 illustrates a radar decoy 1 with a radar reflector 3 supported by a deployed parachute 5. The parachute 5 has a canopy 7 to which suspension lines 9 are attached, which descend to retain a load 11. During parachuted descent of the load 11, the canopy 7 is inflated by an incoming flow of air not designated in FIG. 1, entering at the bottom 13 of the canopy via a bottom opening 15, or an inlet 15, and exiting through a vent opening 17, or vent 17, opened at the apex 19 of the canopy. The canopy 7 is preferably configured as a hemisphere, the circular inlet 15 of which defines a diameter 21 and a periphery 23. A first upper end 25 of the suspension lines 9 is fixedly connected in spaced apart distribution along the periphery 23 of the canopy 7. The second lower ends 27 of the suspension lines 9 are jointly connected to the load 11. The term diameter is used below for the sake of ease of explanation, although the parachute is not necessarily hemispherical, but generally features a circular bottom opening.

For the sake of orientation, there is shown a vertical axis z, passing through a centerline of the parachute 5, from the load 11 upward to the vent 17 at the top, pointed in the direction of the incoming airflow. In FIG. 1, a diameter 21 is shown collinear with the x-axis, which is perpendicular to the y-axis. Both the x and the y-axis are coplanar with the plane of the periphery 23, and together with the z-axis, the three axes form a three-dimensional system of orthogonal coordinates, thereby defining x-z, y-z, and x-y planes, as well as eight octants.

In addition to the suspension lines 9, a central line 29, collinear with the axis z, fixedly connects between the apex 19 and the load 11. The load end 31 of the central line 29 is connected to the lower ends 27 of the suspension lines 9, thus to the load 11, while the apex end 33, not shown in the FIGS., of the central line 29 is fixedly attached to the apex 19.

Figure 8:
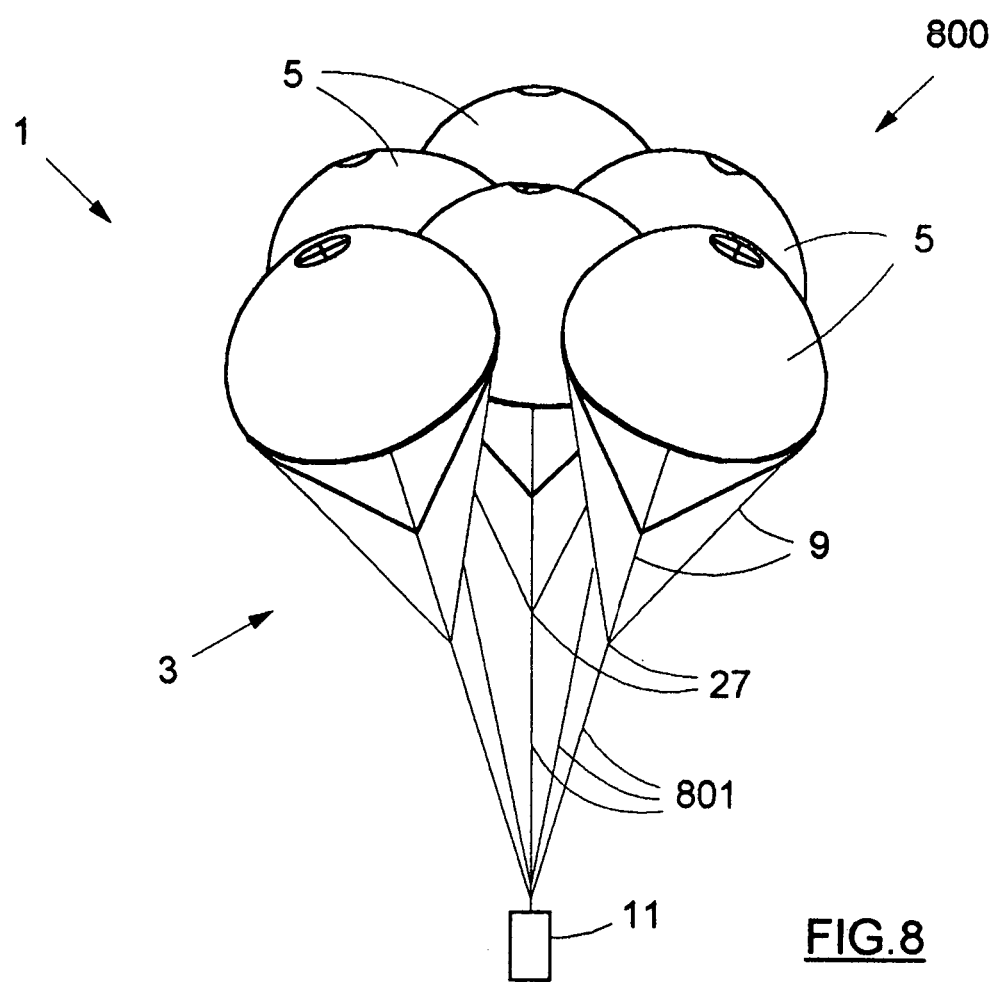
FIG. 8 presents a cluster of the radar decoys.

In the description below, similar reference numerals and characters refer to similar elements in the various FIGS. It is noted that for the sake of clarity the suspension lines are shown only in FIG. 1, and schematically in FIG. 8.

Figure 2A:
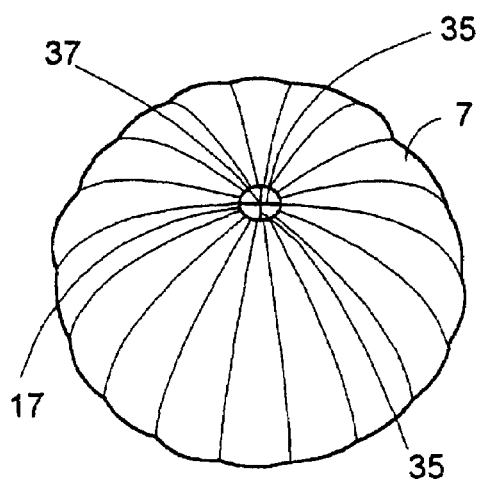
FIGS. 2a and 2b depict two details of the radar decoys shown in FIG. 1.
Figure 2B:
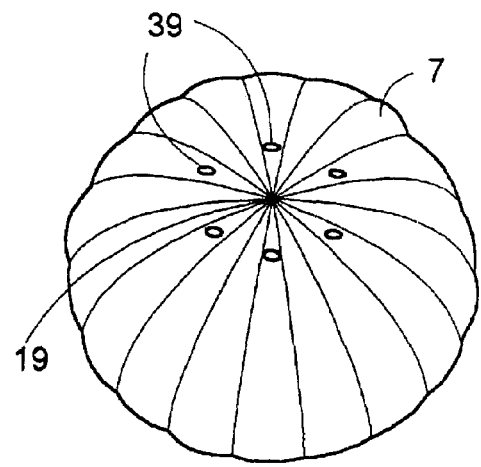

FIGS. 2a and 2b depict two exemplary details out of the alternatives for coupling the central line 29 to the apex 19 in spite of the vent 17. FIGS. 2a and 2b each show a possible fixed connection of the apex end 33 to the apex 19. In FIG. 2a, one or more pliable strips of fabric 35 diametrically span the vent 17, with the apex end 33 fixedly connected at the middle 37, or crossing point 37, of the strips 35. If necessary, the surface of the vent is slightly enlarged, to adjust for the air outlet surface obstructed by the strips 35. As another possible solution shown in FIG. 2b, the apex end 33 is fixedly connected to the apex 19 of the canopy 7, while the vent 17 is replaced by a plurality of sub-vents 39, of equivalent surface to the vent 17, and in equal symmetric distribution around the apex 19, to maintain the stability of the canopy 7.

Still with reference to FIG. 1, an elastic resilient element 41, is mounted in collinear extension as one portion of the central line 29, preferably close to, or adjacent to the load end 31. Although present with all the embodiments described below, the elastic resilient element 41 is shown only in FIG. 1. The resilient element 41 ensures that when the parachute 5 descends, the central line 29 remains under tension, thus always stretched taut. Thereby, the radar reflector 3 is kept properly aligned and stretched. Else, if slackened, say by a gust of wind, as may happen to the suspension lines 9, the radar cross-section of the radar reflector 3 will be reduced.

It is noted that for a hemispherical canopy 7, the height 43, from the x-y plane of the circular inlet 15 to the apex 19, is equal to half the diameter of the canopy 7. As explained above, the canopy 7 is not necessarily hemispherical.

Figure 3:
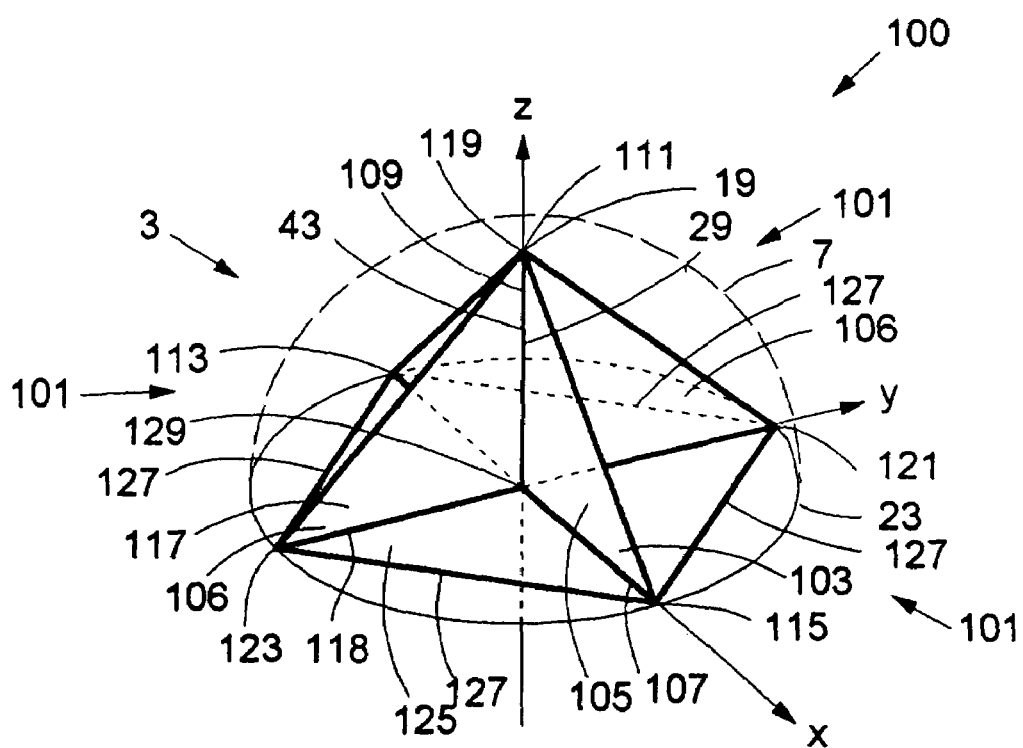
FIG. 3 presents a first embodiment of the radar decoy shown in FIG. 1.

In FIG. 3, the geometry of a first embodiment 100 of a radar reflector 3 having an interior portion disposed in the interior of the hemispherical canopy 7 and forming four trihedral corner reflectors is depicted. Only the four trihedral corner reflectors 101 and the periphery 23 of the canopy 7 are shown, but the canopy 7 is omitted for the sake of clarity. The four adjacent trihedral radar corner reflectors 101 are formed by three mutually orthogonal adjacent panels having surfaces disposed in and above the x-y plane. Two isosceles triangles intersect in perpendicular above a square base disposed in the x-y plane, in perpendicular to both triangles, with the base sides of the triangles forming the diagonals of the square base.

A first panel 103 of isosceles triangular planar shape is coplanar with the x-z plane. The first panel 103 is divided into two first panel portions 105, on each side of the z-axis. A base side of the first panel 103, the first panel base side 107, is collinear with the x-axis and is a diameter 21 that spans the circular inlet 15. The height of the first panel 103, or first panel height 109, is collinear with the z-axis and equal in length to the height 43 of the canopy 7. The apex angle of the first panel 103, or first panel top corner 111, is opposite the first panel base side 107, and two opposite first panel base corners, respectively 113 and 115, are adjacent the first panel base side 107, all fixedly connected to respectively, the apex 19 of the canopy 7 and two diametrically opposite points disposed on the periphery 23 of the canopy 7.

A second panel 117, identical to the first panel 103, has two second panel portions 106, coplanar with the y-z planes. The second panel 117, symmetrically intersecting the first panel 103, has a second panel base side 118 perpendicular to the first panel base side 107, and a second panel top corner 119 and two second panel base corners 121 and 123. The second panel 117 is fixedly connected to the canopy 7, namely by the second panel top corner 119 to the apex 19, and by each one second panel base corner 121 and 123 to diametrically opposite points on the periphery 23 of the circular inlet 15.

Finally, a third panel 125 of square planar surface with four third-panel sides 127 is disposed in the x-y plane, in orthogonal underneath the first panel 103 and the second panel 117, to form four trihedral corner reflectors 101. The third square panel 125 is fixedly connected by each one of its four corners to the periphery of the circular inlet 15, at the connection points of the first and second panel base corners 113, 115, 121 and 123. The connection points of the four corners of the third panel 125 on the periphery 23 are now also referred to below as the connection points 113, 115, 121 and 123. The central line 29 is thus collinear with an intersection axis common to the first panel 103, to the second panel 117, and to a mid point 129 of the third panel 125.

In practice, it is advantageous to use a commercially available parachute 5 with a hemispherical canopy 7, particularly as produced by the Magam Betihut Ltd. P.O. Box 787, Haifa 31007, Israel, as catalog number 09873494. The canopy 7 is made from a F111 type low porosity and lightweight pliable fabric, according to US Standard Mil C 44378 Type 1. Other types of similar fabrics may also be used if desired. Typical dimensions of such a hemispherical parachute 5 feature a circular inlet 15 of 2 m of diameter, 16 suspension lines 9, which are 2.5 m long, and a vent 17 with a diameter of 16 mm. The length of the suspension lines 9 is 2.5 m and the length of the central line 29 is about 3.29 m. In descent with a load 11 weighing 4.5 kg, the average angle of oscillation of the parachute 5 ranges from $\pm 10°$ to $\pm 15°$.

According to the dimensions of the parachute 5, the first triangular panel 103 has a base of 2 m and a height of 1 m. The second panel 117 is orthogonal and identical to the first triangular panel 103, and each third panel side 127 of the third square panel 125, is 1.41 m long.

To keep costs low, it is preferable to select the parachute 5 as a standard item into which the geometry of a radar reflector is integrated. Evidently, in addition to the trihedral corner reflectors of any of the embodiments described below, the central line 29 remains stretched by the resilient element 41, which is possibly implemented as a bungee cord, or an elastic member, or any other linear tensioning element.

As shown in FIG. 1, to further enhance the tension and the stability of the radar reflector 3, a net 131 with, for example, wide, square meshes 133, with a side of some 10 cm, is stretched between the periphery 23 and each third panel side 127. Although the square meshes 133 are also common to all the embodiments described below, they are shown only in FIGS. 1 and 5, for the sake of clarity.

The radar reflector 3 is made for example, from pure-silver metalized Nylon (™) fabric, weighing 40 gr/m². Such a fabric is porous, with 47 holes per square inch, and does not suffer deterioration of its radar reflective properties after having been folded, stretched, or pressed together. If desired, any other radar reflecting lightweight pliable fabric with the same or improved properties will suffice, to make a reflector 3.

The radar reflector 3 and the canopy 7 are fixedly connected together, particularly by sewing, to become one integral parachuted radar decoy 1, which is implemented as one single unit of lightweight pliable fabric that is easily folded into a package of small volume, and if desired, stowed in the interior of a canister of small dimensions.

In descent, the canopy 7 is inflated and extended by the incoming flow of air entering the circular inlet 15, which stretches the periphery 23, while the suspension lines 9 and the central line 29 are kept under tension by the load 11. Since the radar reflector 3 is integral with the canopy 7, the radar reflector 3 is also stretched and kept under tension. The net 131 with the wide meshes 133 further contributes to the uniform tensioning of the radar reflector 3.

The central line 29, which is fitted with the resilient element 41, helps to maintain the stretched geometry and mutual orientation of the panels of the radar reflector 3, even when a gust of wind tends to slacken the construction. Since the central line 29 is common to all three first, second, and third panels, designated respectively as 105, 117 and 123, tension is assured.

The integration of a radar reflector 3 in the interior of the canopy 7 of the parachute 5 does not affect aerodynamic properties, particularly stability and rate of descent. However, if necessary, modifications to the structure of the parachute are easy to introduce. This is achieved, for example, by modifying the size of the vent 17, the porosity of the fabric of the canopy 7, or the fabric of the radar reflector 3.

The parachute 5 and the radar reflector 3 constitute an integrated structure made from pliable material, easy for packaging and stowage in the interior of a container. Once the parachute 5 is retrieved from the container and inflated by the incoming flow of air, the radar reflector 3, which is deployed simultaneously with the parachute, becomes operative. Moreover, the load 11 is either a dummy load, which may be replaced by an operational payload if desired, to further enhance the operational functionality of the parachuted radar decoy 1. If desired, the load functions as a decoy operative in association with the radar decoy, or else, the load is operative as an independent decoy.

The geometry of further embodiments 200 to 600 of the parachuted radar reflector 3 are described below, all having the parachute 5 with the hemispherical canopy 7, the suspension lines 9, the central line 29, the resilient elastic element 41, and the net 131 in common. Also common to the embodiments 200 to 600 are the third square panel 125, and the four connection points to the periphery 23, namely 113, 115, 121 and 123.

Figure 4:
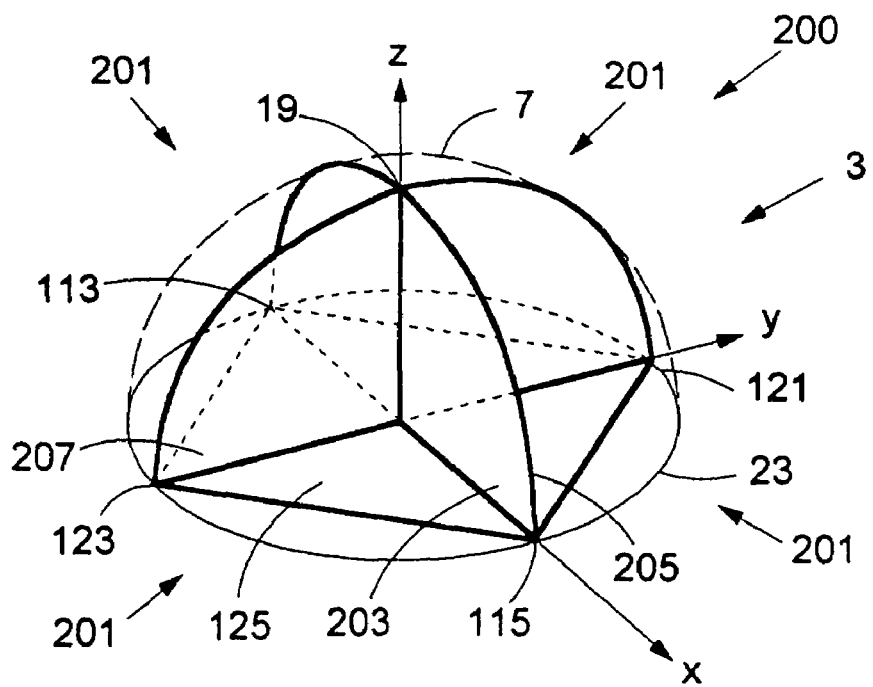
FIG. 4 shows a second embodiment of the radar decoy of FIG. 1.

In FIG. 4, the geometry of a second embodiment 200 of a radar reflector 3 disposed in the interior of the hemispherical canopy 7 is depicted. Only four trihedral corner reflectors 201 and the periphery 23 of the canopy 7 are shown, but the canopy itself is omitted for the sake of clarity. The four adjacent trihedral radar corner reflectors 201 are formed by three mutually orthogonal adjacent panel surfaces disposed in the interior of the canopy 7, in and above the x-y plane.

A first semi-circular panel 203 is defined as the portion of the x-z plane bound by the intersection of the interior of the canopy 7 and the x-axis. The panel periphery 205 that conforms to the semi-circular arc of the intersection of the x-z plane with the hemispherical canopy 7 is fixedly attached to the canopy along the whole length of the intersection. The semi-circular arc 205 starts at the connection point 113, passes through the apex 19 and ends at the connection point 115. Furthermore, the first semi-circular panel 203 is also fixedly connected to the third panel along the x-axis.

A second semi-circular panel 207 is identical to the first semi-circular panel 203 and in perpendicular intersection thereto. The second semi-circular panel 207 is fixedly connected to the canopy 7 in the same manner as the first semi-circular panel 203, thus along the intersection with the canopy 7 and along the diameter thereof on the y-axis.

The third panel 125 of square surface orthogonally supports both the first semi-circular panel 203 and the second semi-circular panel 207, to form four trihedral corner reflectors 201 in the interior of the canopy 7, thus from the third panel 125 of square surface and up to the canopy.

For a hemispherical canopy 7 of 2 m of diameter, the surface of the first semi-circular panels 203 and 207, is about 1.57 m$^2$ in the embodiment 200, whereas the surface of the first panel 103 and of the second panel 117 of equilateral triangular planar shape is only 1 m$^2$ in the embodiment 100. When deployed, stretched, and in optimal orientation, the radar reflector 3 of embodiment 200, has a radar cross-section which is evidently larger than the RCS of the embodiment 100.

Figure 5:
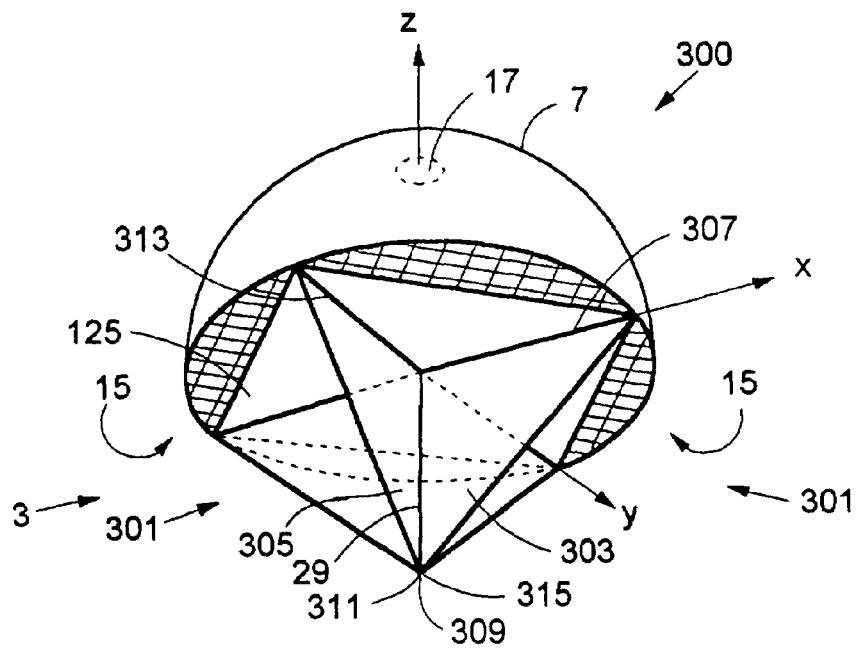
FIG. 5 depicts a third embodiment of the radar decoy of FIG. 1.

In FIG. 5, the geometry of a third embodiment 300 of a radar reflector 3 having an exterior portion disposed on the exterior of and below the canopy adjacent the bottom opening of the hemispherical canopy 7 is depicted. Embodiment 300 is a mirror image of embodiment 100, mirrored downward about the third panel 125.

The four lower adjacent trihedral radar corner reflectors 301 are formed by three mutually orthogonal adjacent panel surfaces, of which two are disposed below the x-y plane and one is coplanar with the x-y plane, respectively, two isosceles triangles that intersect in perpendicular and the square base 125 orthogonal to the triangles, with the base of the triangles forming the diagonals of the square.

In the embodiment 300, a first lower triangular panel surface 303 coplanar with the x-z plane symmetrically and orthogonally intersects a second lower triangular panel surface 305, which is coplanar with the y-z plane.

Both the first and the second lower triangular panel surfaces, respectively 303 and 305, have the same shape and the same dimensions, and are also equal in shape and dimensions to the first and the second panels, respectively 103 and 117, pertaining to the first embodiment 100. The first lower base 307 of the first lower triangular panel surface 303 spans the diameter of the circular inlet 15 on the x-axis, and has a first lower corner 309, which is the angle opposite the first lower base 307, meeting the central line 29 at a lower point 311. Likewise, the second lower base 313 of the second lower triangular panel surface 305 spans the diameter of the circular inlet 15 on the y-axis, and has a second panel lower corner 315 meting the central line 29 at the lower point 311.

The first and the second lower base, respectively 307 and 313 rest respectively, on the x-axis and on the y-axis, to form an integral portion with the third panel 125 and with the parachute 5. The distance between the third panel 125 and the lower common point 309 disposed on the central line 29 is equal to about half the diameter of the circular inlet 15, which is also the height of the canopy 7 and of the first panel 103.

The radar reflector 3 of embodiment 300 has a radar cross-section equal to the RCS of the first embodiment 100.

Figure 6:
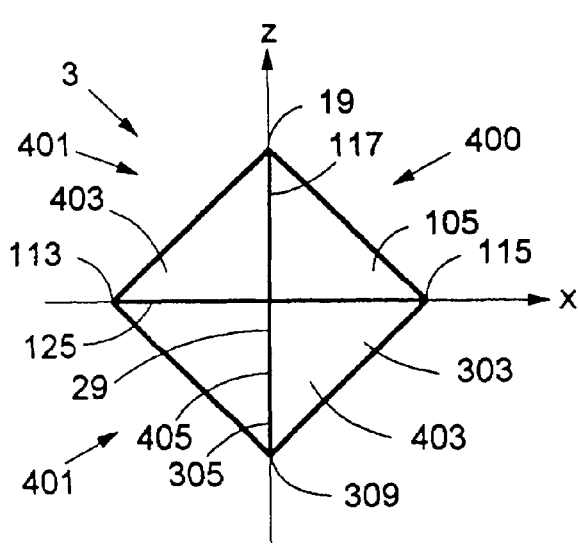
FIG. 6 is a fourth embodiment of the radar decoy shown in FIG. 1.

FIG. 6 schematically illustrates a fourth embodiment 400 of a radar reflector 3, shown without the parachute 5. The geometry of embodiment 400 is implemented to form a radar reflector 3 disposed in the interior of as well as on the exterior to the canopy 7, by joining the first configuration 100 and the third configuration 300 to form eight trihedral corner reflectors 401 arranged substantially as an octahedron. This means that the first panel surface 105 and the first lower triangular panel surface 303 form one primary panel surface 403, in symmetry around the x-axis and the z-axis. For example, the first lower triangular panel surface 303 extends away in mirroring symmetry about the first panel base side 107.

Likewise, the second panel 117 and the second lower triangular panel surface 305 are coplanar in the y-z plane, to form one secondary panel surface 405, in symmetry around the y-axis and the z-axis. Both the primary and the secondary panels, respectively 403 and 405 are orthogonal and intersect along the central line 29.

The third panel 125 of square surface coplanar with the x-y plane, intersects the primary and the secondary panels, respectively 403 and 405, at mid-height between the apex 19 and the lower common point 309.

The primary panel surface 403, the secondary panel surface 405, and the third panel 125, all of square shape, are fixedly coupled together in symmetry around the central line 29 and the x-y plane. Fixed coupling to the parachute 5 is made, at the apex 19, at the four connection points 113, 115, 121 and 123, disposed on the periphery 23 of the circular inlet 15, and to the central line 29, common to three panel surfaces forming the eight trihedral corner reflectors 401. Thereby, there are provided an interior portion and an exterior portion operative as an omnidirectional isometric octahedral radar reflector decoy.

Figure 7:
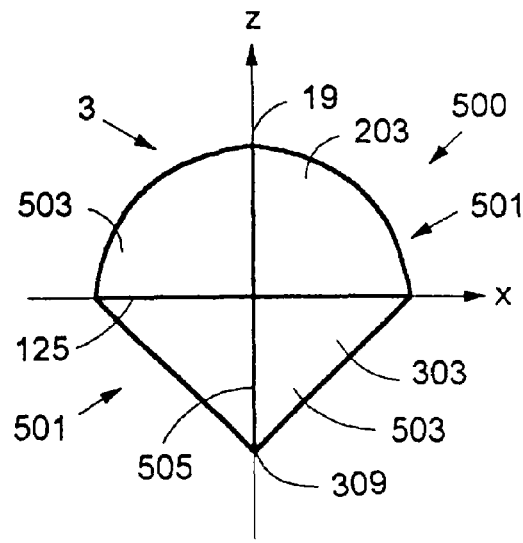
FIG. 7 illustrates a fifth embodiment of the radar decoy of FIG. 1.

FIG. 7 schematically illustrates a fourth embodiment 500 of a radar reflector 3, without the parachute 5. The geometry of embodiment 500 is implemented by joining the second configuration 200 and the third configuration 300 to form eight trihedral corner reflectors 501 arranged generally both in the interior of and exterior to the canopy 7. With the fourth embodiment 500, the portion of the radar reflector 3 disposed in the interior of the canopy 7 has a larger surface than the portion disposed on the exterior of the canopy.

The first semi-circular panel 203 and the first lower triangular panel surface 303 form one first prime panel 503, coplanar with the x-z plane, symmetrical about the z-axis, thus with a semi-circular upper portion above the x-axis and a triangular lower portion below the x-axis. As described above with respect to the second embodiment 200, the semi-circular periphery 205 of the first prime panel 503 is conform to the canopy 7 and is fixedly attached thereto along the whole length of that periphery, in the same manner as the first semi-circular panel 201.

A second prime panel 505 is identical to and orthogonally intersects the first prime panel 503, in symmetry about the z-axis.

The third panel 125 of square surface, coplanar with the x-y plane, orthogonally intersects the first prime and the second prime panels, respectively 503 and 505, at mid-height between the apex 19 and the lower common point 309.

The first prime panel 503, the second prime panel 505, and the third panel 125, are fixedly coupled together in symmetry about the z-axis. Fixed coupling to the parachute 5 is made, at described above for embodiment 200 and embodiment 300.

It is noted that the radar cross-section, RCS, of a corner reflector at optimum orientation for the triangular-sided reflectors of embodiment 400 is given by the following equation (1):

$$RCS=2\pi R^4/3\lambda \qquad (1)$$

However, for the embodiment 500, with larger reflector surfaces, the RCS is enhanced by about 57%.

In operation, it is possible to cluster radar decoys 1. For example, a cluster of a plurality of radar decoys 1 is achieved by fixedly connecting a plurality of parachutes 5 together, whereby the radar cross-section achieved is a multiple of the plurality of parachutes in the cluster. Practice has proven that an embodiment 800, particularly a cluster of a multiplicity of radar decoys 1 depicted in FIG. 8, is an advantageous configuration. Instead of coupling each parachute 5 to a load 11, each one is provided with an extension line 801 some 2.5 long. Each extension line 801 is attached intermediate the second lower end 27 of the suspension lines 9 and the load 11.

With a cluster, the size of the RCS is multiplied, providing an enlarged radar cross-section. A momentary reduction of the RCS of a single radar reflector 3 out of the cluster, particularly caused by a gust of wind somewhat folding the canopy 7, becomes imperceptible.

Figure 9:
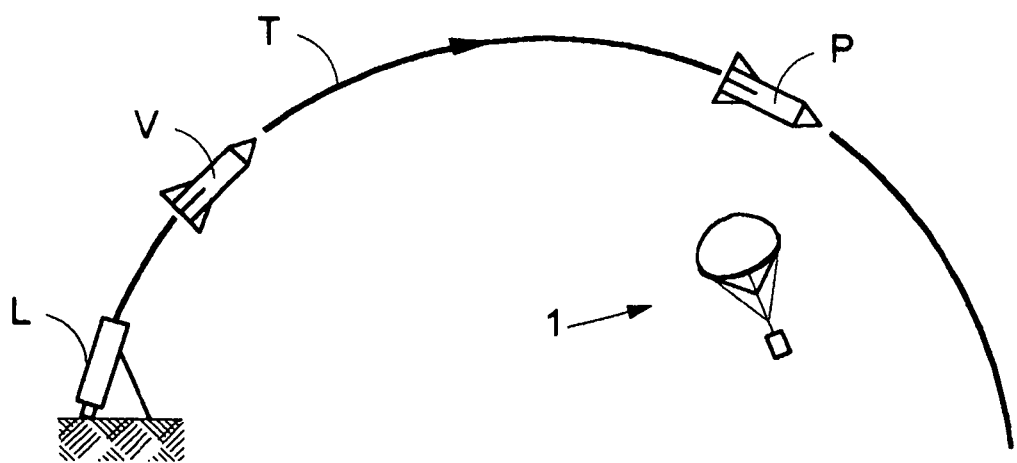
FIG. 9 depicts the deployment of the radar decoy of FIG. 1.

FIG. 9 schematically illustrates the deployment of a radar decoy 1. The radar decoy 1 being made out of pliable, lightweight and thin radar reflective material foldable for containment in a small dimension canister is operable for stowage and ejection from an airborne vehicle. Thereby, the radar decoy becomes operative after ejection from the airborne vehicle and immediately after deployment of the parachute 5.

With reference to FIG. 9, a vehicle V, launched from a launcher L, is fired into trajectory T. At a point P on the trajectory T, the folded radar decoy 1 is ejected from the vehicle V and deployed as to become operative. If desired, the airborne vehicle is propelled by a rocket motor or launched by a piece of artillery.

It will be appreciated by persons skilled in the art, that the present invention is not limited to what has been particularly shown and described hereinabove. For example, parachutes 5 of various dimensions are possibly used alone and even in a cluster. Furthermore, in operational use, a radar decoy 1 may contain one radar decoy 1 in combination with active or passive, radar or other decoys. Rather, the scope of the present invention is defined by the appended claims and includes both combinations and subcombinations of the various features described hereinabove as well as variations and modifications thereof which would occur to persons skilled in the art upon reading the foregoing description.

The invention claimed is:

1. A radar decoy descending on a parachute having an inflated canopy for retarding descent, the canopy having an interior, an exterior, an apex, and a bottom opening with a diameter and a periphery, to which a first upper end of a plurality of suspension lines is fixedly connected in spaced apart distribution to retain a hanging load, which is fixedly connected to a second lower end of the plurality of suspension lines, comprising:

a radar reflector having an interior portion disposed in the interior of the canopy intermediate the apex and the bottom opening, and a plurality of reflective panels forming the radar reflector, each reflective panel being coupled to the periphery, and at least two reflective panels being coupled the apex.

2. The radar decoy according to claim 1, wherein:

at least four trihedral corner reflectors disposed in the interior of the canopy and forming the interior portion are configured as three mutually orthogonal reflective panels coupled to the periphery, and have two reflective triangular panels being also coupled to the apex.

3. The radar reflector according to claim 2, wherein:

the two reflective triangular panels disposed in the interior of the canopy extend to conform to and to be coupled to the interior of the canopy, intermediate the apex and the bottom opening, whereby a first and a second substantially semi-circular panel provide a radar reflector with an enhanced radar cross-section.

4. The radar decoy according to claim 1, wherein:

the radar reflector has an exterior portion disposed on the exterior of and below the canopy adjacent the bottom opening, and a plurality of reflective panels, each panel having a surface and forming the exterior portion are coupled to the periphery, and two panels are coupled to a central line extending from the apex top to the load.

5. The radar decoy according to claim 4, wherein:

the exterior portion is configured to form four trihedral corner reflectors.

6. The radar decoy according to claim 5, wherein:

the exterior portion is integral with the interior portion.

7. The radar decoy according to claim 6, wherein:
the interior portion and the exterior portion of the radar reflector are configured to form eight trihedral corner reflectors.

8. The radar reflector according to claim 7, wherein:
the two reflective triangular panels of the interior portion extend to conform to and to be coupled to the interior of the canopy, intermediate the apex and the bottom opening,
whereby a first and a second substantially semi-circular panel provide a radar reflector with an enhanced radar cross-section.

9. The radar decoy according to claim 1, wherein:
the load is functionally operative as a decoy and is either one of both operative in association with the radar decoy and independent therefrom.

10. The radar decoy according to claim 1, wherein:
the canopy is hemispherical and has a canopy height equal to substantially half the diameter of the bottom opening,
a central line is coupled from the apex to the load,
the interior portion has three mutually orthogonal reflective panels, each panel having a surface and forming four trihedral radar corner reflectors, wherein:
a first panel of isosceles triangular shape has a first panel base side spanning the inlet opening, and has a height equal in length to the canopy height, with a first panel top corner opposite the first panel base side, and two opposite first panel base corners adjacent the first panel base side, the first panel top corner and the two first panel base corners being fixedly coupled to, respectively, the apex and to two diametrically opposite points disposed on the periphery,
a second panel, orthogonally intersecting and identical in shape and surface to the first panel, has a second panel base side, which is fixedly coupled by a second panel top corner to the apex, and by each one of two second panel base corners to the periphery, and
a third panel of square surface is orthogonally disposed adjacent the first and the second panel base side of respectively, the first and of the second panel, to form four trihedral corner reflectors, with each one corner of the square surface being fixedly coupled to the periphery at the first and at the second panel base corners,
whereby the central line is collinear with an intersection axis common to both the first and the second panel.

11. The radar decoy according to claim 10, having an exterior portion with three mutually orthogonal panels, each panel having a surface forming four trihedral radar corner reflectors, wherein:
a fourth panel, or first lower triangular panel surface, of shape and surface equal to the first panel and extending away therefrom in mirroring symmetry about the first panel base side, has two first lower base corners each adjacent the first panel base corners, and has in opposite to the first panel top corner, a first panel lower corner fixedly coupled to a lower point on the central line, at a distance from the apex equal to twice the canopy height, and
a fifth panel, or second lower triangular panel surface, orthogonal to the fourth panel and identical thereto in shape and in surface, has two second panel lower base corners adjacent the second panel base corners, and has a second panel lower corner which is fixedly coupled to the lower point,
whereby the third panel is common to the first, the second, the fourth and the fifth panel to form eight trihedral radar corner reflectors, providing an interior portion and an exterior portion operative as an omnidirectional isometric octahedral radar reflector decoy.

12. The radar decoy according to claim 11, wherein:
the surface of each one of the first and the second reflective triangular panels is extended to conform to and to be coupled to the interior of the canopy, intermediate the apex and the bottom opening,
whereby a first and a second substantially semi-circular panel provide a radar reflector of enhanced radar cross-section.

13. The radar decoy according to claim 12, wherein:
a cluster of radar decoys is formed by attaching together a plurality of parachutes having radar reflectors, the parachutes being coupled together at the second lower end of the suspension lines,
whereby an enlarged radar cross-section is achieved by the cluster of parachutes.

14. The radar decoy according to claim 12, wherein:
the radar decoy has reflective panels made from pliable, lightweight and thin radar reflective material foldable for containment in a small dimension canister, and operable for stowage and ejection from an airborne vehicle (V),
whereby the radar decoy becomes operative after ejection from the airborne vehicle and deployment of the parachute.

15. The radar decoy according to claim 14, wherein:
the airborne vehicle is an unmanned airborne vehicle.

16. The radar decoy according to claim 14, wherein:
the airborne vehicle is either one of both propelled by a rocket motor and launched by a piece of artillery.

17. A method for providing a radar decoy operable when descending on a parachute having an inflated canopy for retarding descent and having an interior and an exterior, the canopy having an apex, and an inlet with a bottom opening, a diameter, and a periphery to which a first upper end of a plurality of suspension lines is fixedly coupled in spaced apart distribution to retain a hanging load, which is fixedly coupled to at a second lower end of the plurality of suspension lines, the method comprising the steps of:
disposing a radar reflector having an interior portion in the interior of the canopy, intermediate the apex and the bottom, and
providing a plurality of reflective panels having a surface and forming the radar reflector, each reflective panel being coupled to the periphery, and at least two reflective panels being coupled the apex.

18. The method according to claim 17, wherein:
the radar reflector is configured as four trihedral corner reflectors formed by three mutually orthogonal reflective panels coupled to the periphery, and is disposed in the interior of the canopy, and two triangular panels of the radar reflector are coupled to the apex.

19. The method according to claim 18, wherein:
the surface of each one reflective triangular panel extends to conform to the interior of the canopy, and
the extended surface is coupled intermediate the apex and the bottom.

20. The method according to claim 17, wherein:
at least one exterior portion of the radar reflector is disposed on the exterior of and below the canopy adjacent the bottom opening, and
the radar reflector is configured with a plurality of reflective panels coupled at least to the periphery.

21. The method according to claim 20, wherein:
the exterior portion is configured to form four trihedral corner reflectors.

22. The method according to claim 21, wherein:
the exterior portion is integral with the interior portion.

23. The method according to claim 22, further comprising the step of:
the interior portion and the exterior portion of the radar reflector are configured to form eight trihedral corner reflectors.

24. The method according to claim 23, wherein:
the two reflective triangular panels of the interior portion extend to conform to and to be coupled to the interior of the canopy, intermediate the apex and the bottom opening,
whereby a first and a second substantially semi-circular panel provide a radar reflector with an enhanced radar cross-section.

25. The method according to claim 17, wherein:
the load is functionally operative as a decoy and is either one of both operative in association with the radar decoy and independent therefrom.

26. The method according to claim 17, wherein:
the canopy is hemispherical and has a canopy height equal to substantially half the diameter of the bottom opening,
a central line is coupled from the apex to the load,
the interior portion has three mutually orthogonal reflective panels, each panel having a surface and forming four trihedral radar corner reflectors, wherein:
a first panel of isosceles triangular shape has a first panel base side spanning the inlet opening, and has a height equal in length to the canopy height, with a first panel top corner opposite the first panel base side, and two opposite first panel base corners adjacent the first panel base side, the first panel top corner and the two first panel base corners being fixedly coupled to, respectively, the apex and to two diametrically opposite points disposed on the periphery,
a second panel, orthogonally intersecting and identical in shape and surface to the first panel, has a second panel base side, which is fixedly coupled by a second panel top corner to the apex, and by each one of two second panel base corners to the periphery, and
a third panel of square surface is orthogonally disposed adjacent the first and the second panel base side of respectively, the first and of the second panel, to form four trihedral corner reflectors, with each one corner of the square surface being fixedly coupled to the periphery at the first and at the second panel base corners,
whereby the central line is collinear with an intersection axis common to both the first and the second panel.

27. The method according to claim 26, wherein the radar decoy has an exterior portion with three mutually orthogonal panels, each panel having a surface forming four trihedral radar corner reflectors, wherein:
a fourth panel, or first lower triangular panel surface, of shape and surface equal to the first panel and extending away therefrom in mirroring symmetry about the first panel base side, has two first lower base corners each adjacent the first panel base corners, and has in opposite to the first panel top corner, a first panel lower corner fixedly coupled to a lower point on the central line, at a distance from the apex equal to twice the canopy height, and
a fifth panel, or second lower triangular panel surface, orthogonal to the fourth panel and identical thereto in shape and in surface, has two second panel lower base corners adjacent the second panel base corners, and has a second panel lower corner which is fixedly coupled to the lower point,
whereby the third panel is common to the first, the second, the fourth and the fifth panel to form eight trihedral radar corner reflectors, providing an interior portion and an exterior portion operative as an omnidirectional isometric octahedral radar reflector decoy.

28. The method according to claim 27, wherein:
the surface of each one of the first and the second reflective triangular panels is extended to conform to and to be coupled to the interior of the canopy, intermediate the apex and the bottom opening,
whereby a first and a second substantially semi-circular panel provide a radar reflector of enhanced radar cross-section.

29. The method according to claim 28, wherein:
a cluster of radar decoys is formed by attaching together a plurality of parachutes having radar reflectors, the parachutes being coupled together at the second lower end of the suspension lines,
whereby an enlarged radar cross-section is achieved by the cluster of parachutes.

30. The method according to claim 28, wherein:
the radar decoy has reflective panels made from pliable, lightweight and thin radar reflective material foldable for containment in a small dimension canister, and operable for stowage and ejection from an airborne vehicle (V),
whereby the radar decoy becomes operative after ejection from the airborne vehicle and deployment of the parachute.

31. The method according to claim 30, wherein:
the airborne vehicle is an unmanned airborne vehicle.

32. The method according to claim 30, wherein:
the airborne vehicle is either one of both propelled by a rocket motor and launched by a piece of artillery.

33. The radar decoy, according to claim 32, wherein:
one reflective panel is further coupled to the periphery of the canopy by a net.

* * * * *